US007191439B2

United States Patent
Donaldson et al.

(10) Patent No.: US 7,191,439 B2
(45) Date of Patent: Mar. 13, 2007

(54) VERIFICATION OF SOFTWARE APPLICATION ATTRIBUTES FOR OPTIMAL COMPATIBILITY WITH A SOFTWARE SYSTEM

(75) Inventors: Jesse Donaldson, San Jose, CA (US); Steven C. Lemke, Sunnyvale, CA (US); Roger Flores, Redwood City, CA (US); Robert Ebert, Montpellier (FR)

(73) Assignee: PalmSource, Inc., Sunnyvale, CA (US)

( * ) Notice: Subject to any disclaimer, the term of this patent is extended or adjusted under 35 U.S.C. 154(b) by 920 days.

(21) Appl. No.: 09/796,031

(22) Filed: Feb. 28, 2001

(65) Prior Publication Data

US 2002/0199180 A1 Dec. 26, 2002

(51) Int. Cl.
*G06F 9/445* (2006.01)
(52) U.S. Cl. ............... 717/178; 717/121; 717/122; 717/173
(58) Field of Classification Search ........ 717/168–178, 717/112–122
See application file for complete search history.

(56) References Cited

U.S. PATENT DOCUMENTS

| | | | | |
|---|---|---|---|---|
| 5,579,509 A | * | 11/1996 | Furtney et al. ............ 703/27 |
| 5,870,611 A | * | 2/1999 | London Shrader et al. . | 717/175 |
| 6,237,144 B1 | * | 5/2001 | Delo ............................ | 717/174 |
| 6,334,213 B1 | * | 12/2001 | Li .............................. | 717/170 |
| 6,397,254 B1 | * | 5/2002 | Northrup ..................... | 709/227 |
| 6,571,285 B1 | * | 5/2003 | Groath et al. ............... | 709/223 |
| 6,658,659 B2 | * | 12/2003 | Hiller et al. ................ | 717/170 |

OTHER PUBLICATIONS

*Inside Macintosh: Macintosh Toolbox Essentials/ Chapter 2—Event Manager/Event Manager Reference Resource: The Size Resource*, printed from the web site: http://gemma.apple.com/techpubs/mac/Toolbox-87.html on May 29, 2001, pp. 1-6.

* cited by examiner

Primary Examiner—Kakali Chaki
Assistant Examiner—Lawrence Shrader
(74) Attorney, Agent, or Firm—Foley & Lardner LLP

(57) ABSTRACT

A method and system of providing compatibility between a software application and an electronic device are disclosed. An exemplary method includes providing an electronic device having a processor and a memory, the processor running an operating system. The method also includes providing access to a software application configured to run on the process of the electronic device. Further, the method includes checking operating system compatibility information. The operating system compatibility information is included in the software application.

17 Claims, 3 Drawing Sheets

US 7,191,439 B2

VERIFICATION OF SOFTWARE APPLICATION ATTRIBUTES FOR OPTIMAL COMPATIBILITY WITH A SOFTWARE SYSTEM

FIELD OF THE INVENTION

The present specification relates to compatibility of software add-ons with electronic devices. In particular, the invention relates to a compatibility information source in a software add-on, application, module, or plug-in which contains information relating to the compatibility of the software application with the electronic device on which the add-on, application, module, or plug-in is to run.

BACKGROUND OF THE INVENTION

Handheld computers as well as other types of electronic devices include the use of an operating system running on an electronic processor. Third party software developers often develop software modules configured to run under the operating system, on the processor and using the electronic device hardware. When a new version of the operating system or a new version or type of device is developed, the software module may make certain assumptions about the operating system or about the characteristics (hardware and/or software) of the device that are no longer applicable under the new operating system and/or device. Provided with such assumptions, the software module is often unable to function or functions in an undesirable manner.

Accordingly, there is a need for a compatibility information source or software attribute verification resource that is defined by the operating system and is included in the software module. Further, there is a need for a compatibility information source in software modules, add-ons, applications, or plug-ins which communicate assumptions about the operating system and device hardware as well as behavior data. Further, there is a need for a compatibility information source in a software module that is configured to communicate hardware requirements for the software module. Further still, there is a need for a method of developing software which includes the inclusion of software compatibility information within the software module.

The techniques herein below extend to those embodiments which fall within the scope of the appended claims, regardless of whether they accomplish one or more of the above mentioned needs.

SUMMARY OF THE INVENTION

An exemplary embodiment relates to a method of providing compatibility between a software module and an electronic device. The method includes providing an electronic device having a processor and a memory, the processor running an operating system. The method also includes providing access to the software module configured to run on the processor of the electronic device. Further, the method includes checking operating system compatibility information, the operating system compatibility information being included in the software module.

Another exemplary embodiment relates to a method of developing a software module for an electronic device. The method includes accessing a software development tool kit. The method also includes developing the primary functionality of the software module using the software development tool kit. Further, the method includes configuring compatibility information to be included in the software module.

Further still, the method includes compiling the software module into a format executable by the electronic device.

Yet another exemplary embodiment relates to an information source configured to be used in a software module for an electronic device. The resource includes a data structure specifying a plurality of fields configured to contain compatibility information. The compatibility information includes at least one of minimum operating system version information, maximum operating system version information, required features information, and supported features information.

Yet still another exemplary embodiment relates to a method of providing compatibility between a software module and an electronic device. The method includes providing an electronic device having a processor and a memory, the processor running an operating system. The method also includes providing access to the software module configured to run on the processor of the electronic device. Further, the method includes checking development tools version information. The development tools version information based on the version of development tools used to develop the software module.

Yet further still another exemplary embodiment relates to a method of using an electronic device. The method includes providing an electronic device having a processor and memory, the processor running an operating system. The method also includes providing access to the software module configured to run on the processor of the electronic device. Further, the method includes providing access to the software module configured to run on the processor of the electronic device. Further still, the method includes selectively enabling an operating system backward compatibility mode based on the operating system compatibility information.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF EXEMPLARY EMBODIMENTS

Figure 1:
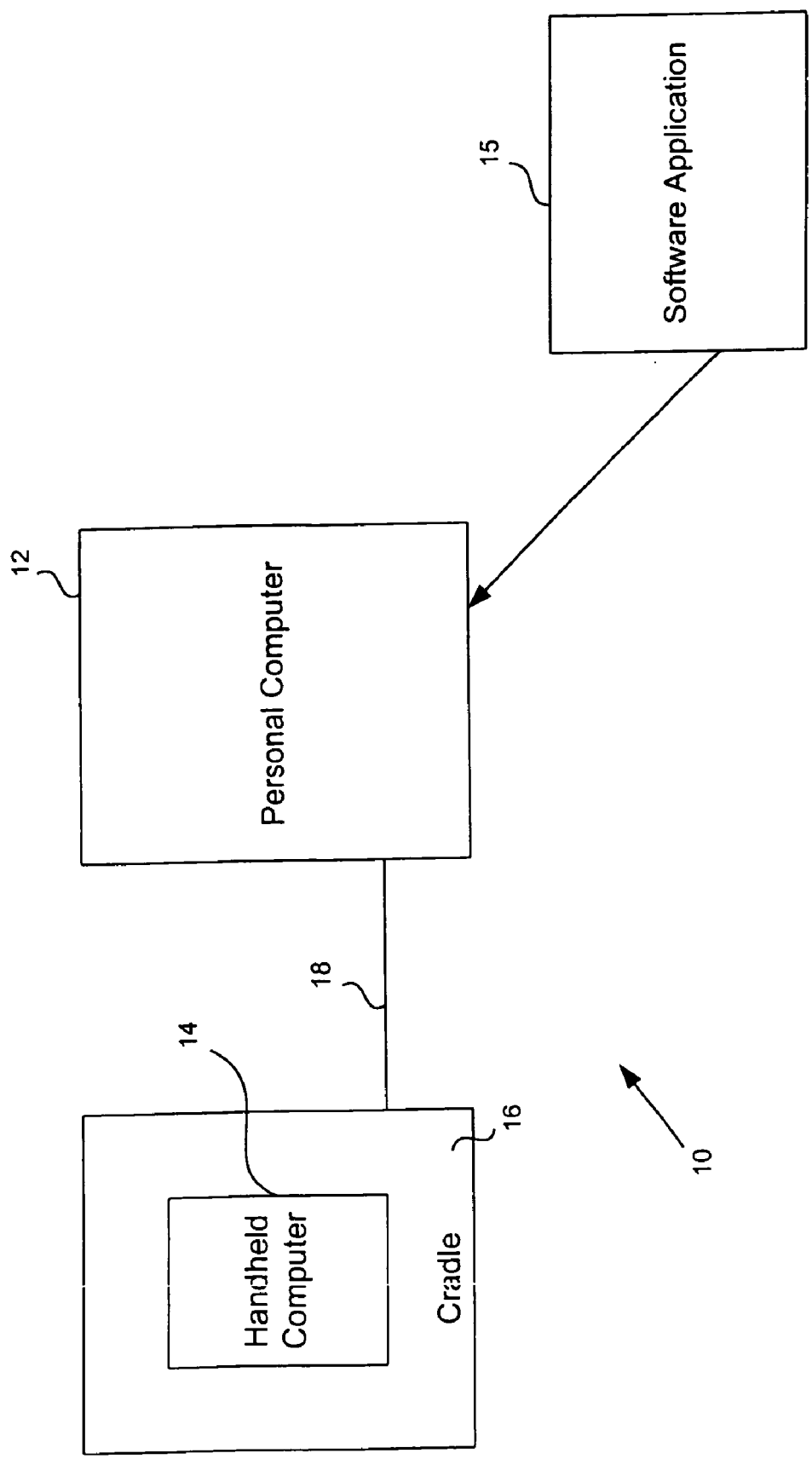
FIG. 1 is a block diagram of a handheld computer system in a particular embodiment configured for installation of a software application.

Referring to FIG. 1, a system 10 is depicted including a computer, such as personal computer 12, a third party software module, add-on application, plug-in, or the like, such as but not limited to software application 15 which may be stored on computer 12, and a portable electronic device, such as but not limited to handheld computer 14. Handheld computer 14 may include a synchronization device, such as synchronization cradle 16 which is electronically coupled to computer 12 via a data link, such as a data cable 18. In operation a user of handheld computer 14 that wants to install software application 15 onto handheld computer 14, may first store application 15 on computer 12. The user then initiates a synchronization or transfer of information over data cable 18 to handheld computer 16 during which application 15 is installed on handheld computer 14.

In alternative embodiments, other system configurations may be used for the installation of software applications such as, but not limited to the direct coupling of handheld computer 14 to a data storage device, such as but not limited to a flash memory card, a disk drive, a CD-ROM drive, a DVD ROM drive, among others. Further, software applications may be installed over a direct communications network link, a wireless communications link, such as a radio frequency (RF) link or over an optical link, for example.

Figure 2:
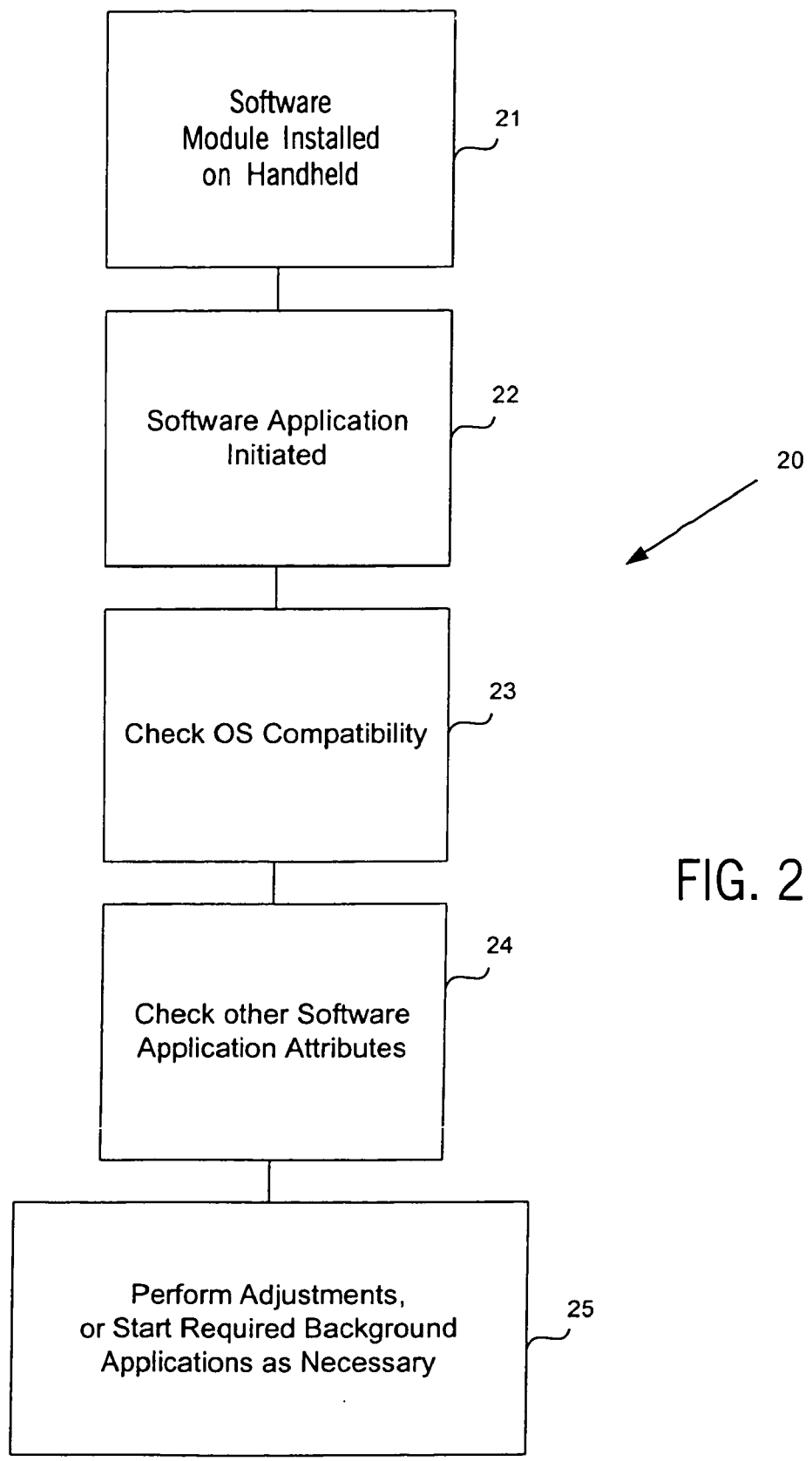
FIG. 2 is a flow diagram depicting exemplary steps in using a software attribute verification resource in a software application.

Referring now to FIG. 2, a flow diagram 20 depicts steps for accommodating software module requirements. A software module is first installed on handheld computer 14 (step 21) using any of a variety of methods and systems including, but not limited to those described above. The operating system on handheld device 14 or a user of device 14 then initiates the software module (step 22). The compatibility information source in the application is then checked for operating system compatibility (step 23). In particular the maximum operating system version compatibility and the minimum operating system version compatibility may be checked. Further, in an exemplary embodiment, different types of operating systems may be checked.

Once the operating system compatibility is determined, the software compatibility information source is checked for other software application attributes (step 24). The other software attributes may include a variety of attributes relating to both software and hardware configurations of the handheld device. For example, misbehavior information may be included in the resource.

Misbehavior information may include information relating to functions of the software application's behavior that are discouraged but are still allowed because future problems may occur if they are not allowed. Some examples of misbehaviors include, but are not limited to reading or writing directly to the screen, reading or writing to the hardware registers, reading or writing to the system global definitions, reading or writing to the memory or data manager structures, reading or writing to unowned resources or record databases.

Another example of a software attribute that may be included in the compatibility information source is a "break me" bit which would indicate that the application behaves in an undesirable manner unless the proper operating system is used. Accordingly, a warning dialog may be displayed when the application is run on an operating system that the application did not know about.

The misbehavior information in general could be used for a variety of uses including restricting access to certain hardware, globals, or other applications. The operating system could also specify that only applications matching certain criteria could be run.

In an alternative exemplary embodiment, other types of behavior information may be specified in the compatibility information source for the module. Behavior information may further include, but is not limited to information about an application's behavior which is legal, but the device needs to be aware of or know about. For example, it may be desirable that a device know about or be aware of whether the application uses or accesses wireless data links or accesses or uses networked resources, accesses or uses expansion cards, communicates with other applications, utilizes a preferred screen depth (allowing the system to make the switch to the preferred screen depth automatically), or provides a list of supported screen depths.

Other alternative examples of information that may be included in the compatibility resource include, for example, devices or special hardware that may be required for use by the application, such as but not limited to Bluetooth radio, or bar code scanners, for example. Further, certain device hardware may be required, such as specific processors, memory sizes and speeds, hardware abstraction layer (HAL) implementations and the like.

Additionally, the compatibility resource contained in a first application may be accessible by a second application, such that the second application may use the first application having the compatibility resource and may make the first application look different, hide the first application, or move the first application to a special category when the second application requirements or assumptions were not met.

In a further alternative exemplary embodiment, if an application specifies in the compatibility information source that it should not be accessing any network resources or other such resources, the operating system may be able to enforce such a constraint or enforce other types of constraints. The enforcement of the constraint may be made for security reasons such that a virus could not spread using the network, for example.

In yet another exemplary embodiment, when software module is being installed on the device, the compatibility information source could be checked by the installation software or by the operating system and reject (refuse to install) any software modules, for which the device is not compatible.

Further still, in another exemplary embodiment, when launching or installing software modules, the operating system may provide an error warning to the user that all application requirements are not met. Further, the operating system may use the information to selectively enable additional "backwards compatibility modes" which would allow older software modules that would otherwise "crash," or fail to operate properly, to run on current devices. For example, games which were written for black and white devices and draw directly to the screen could be made to run on color devices. If the black and white compatibility was known, the operating system could be used to force the application to draw to a virtual display and then convert such drawing to the color display screen.

In an exemplary embodiment, a data structure defined for a software module may be structured as follows:

```
{
// Version 1 fields
UInt16 version;        // version of structure, should be 1 for now.
UInt16 reserved;       // Reserved for future use
UInt32 minOSVersion;   // Minimum required version of PalmOS,
UInt32 maxOSVersion;   // Latest version of PalmOS the application was designed for
UInt32 requireFlags;   // Flags for features required by the application
```

-continued

```
UInt32 compatFlags;        // Flags for features that the application supports
// New fields should be added at the end of the structure, underneath
// a new comment specifying the structure & OS versions (as above).
}   CompatibilityInfoType;
```

In an exemplary embodiment, the minOS and maxOS version numbers may be used to provide the minimum operating system version and maximum operating system version numbers with which the application has been thoroughly tested. Further, the minOS and maxOS version numbers may be replaced by the software development kit version used for the development of the software module. The software development kit version is representative of the minOS and maxOS versions and further may be used to assess backward compatibility.

Also, in an exemplary embodiment, the "require flags" may include bits defined in the following manner:
  requires MC68328 processor;
  requires MC68328EZ processor;
  requires MC68328VZ processor;
  requires ARM family processor;
  requires 68K family processor; or
  requires IrDA.

The "require flags" are not limited to the above mentioned possibilities but may include a variety of other types of bits including but not limited to bits indicating the need for Bluetooth, wireless hardware, Universal Serial Bus (USB) hardware, specific screen depth, drawing directly to the screen, hardware page flipping, GSM/short message service, specific screen sizes, tilt sensor, and many others including but not limited to those discussed above.

The "compatflags" mentioned above may be configured to provide for bits defined as follows:
  warn the user when launching if maxOS requirements are exceeded;
  do not allow application to be run if maxOS requirements are exceeded;
  supports NotifyMgr, which prevents receiving system-wide broadcasts which have been replaced by notifications (time changes, e.g.);
  modifies command bar; and
  other possibilities.

Referring again to FIG. 2, if certain compatibility problems are identified in step 24, adjustments may be performed or background applications may be run to address the compatibility issues or to flag the compatibility issues to a user by display of a dialog or error message.

Figure 3:
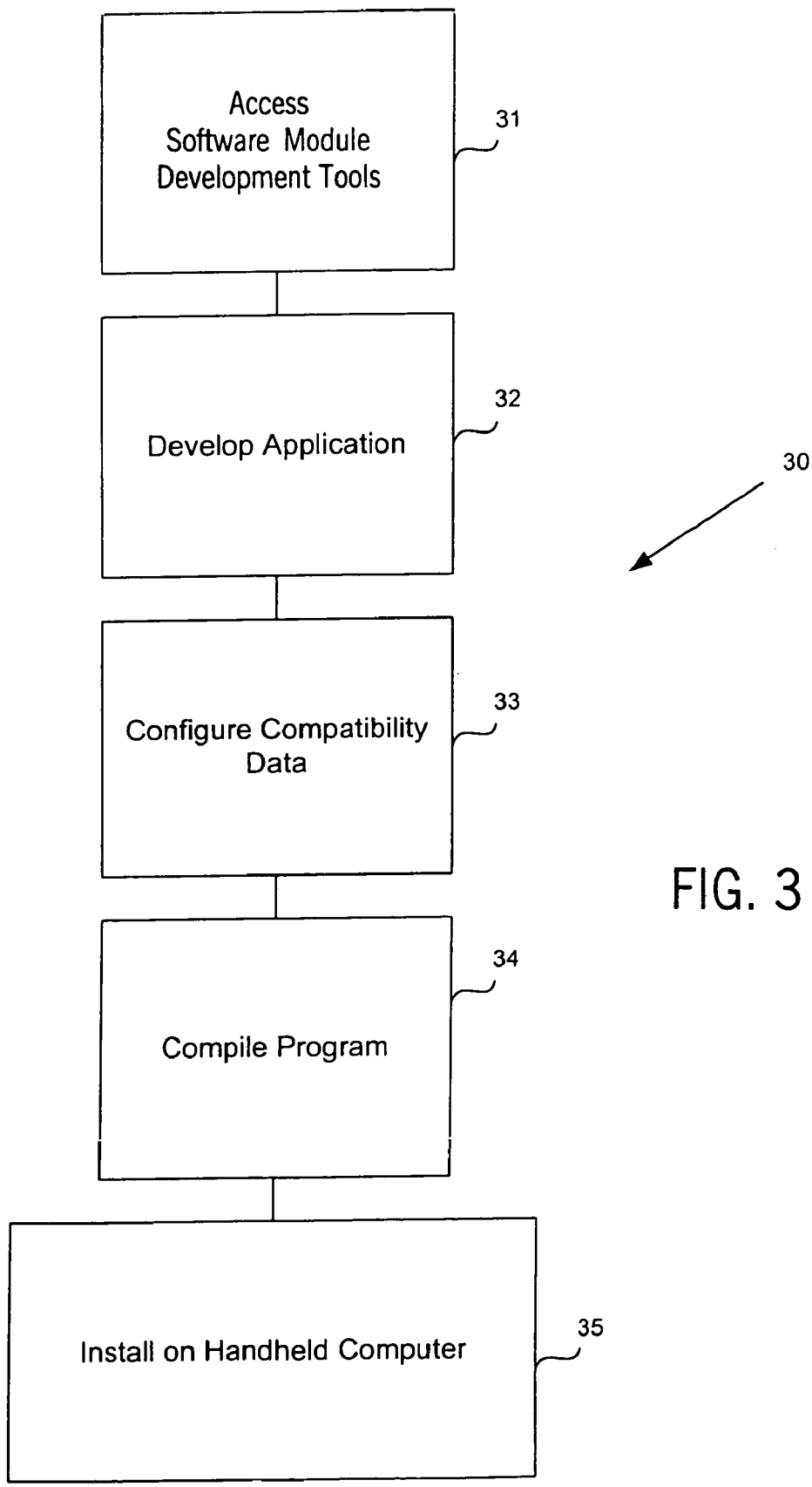
FIG. 3 is a flow diagram depicting exemplary steps in developing a software module including a compatibility information source.

In yet still another exemplary embodiment, software modules, applications, add-ons, or plug-ins may be developed by software developers using software development tools. A software developer may, in an exemplary embodiment follow a process, such as process 30 depicted in FIG. 3 to develop a software module or the like. The software developer optionally accesses a set of software module development tools (step 31), such as a software development kit (SDK) or the like. The developer then develops the primary functionality of the application (step 32). Next, the developer configures the compatibility data (step 33) in a form as exemplified in the discussion above or any of a variety of other forms as described by a device maker, for example. The program is compiled (step 34) into a format useable by the device, such as handheld computer 14.

Finally, the completed program is installed on an electronic device (step 35), such as but not limited to handheld computer 14.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, data structures, or devices used may differ. The systems and methods shown and described are not limited to the precise details and conditions disclosed. Furthermore, other substitutions, modifications, changes, and omissions may be made in the design, operating conditions, and arrangement of the exemplary embodiments and the steps of the exemplary embodiments without departing from the scope of the invention as expressed in the appended claims.

What is claimed is:

1. A method of providing compatibility between a software module and an electronic device, comprising:
  providing an electronic device having a processor and a memory, the processor running an operating system;
  installing the software module on the electronic device;
  providing access to the software module configured to run on the processor of the electronic device; and
  checking operating system compatibility information after the software module has been installed on the electronic device and the software module is being executed on the electronic device, the operating system compatibility information being included in the software module.

2. The method of claim 1, wherein the electronic device is a handheld computer.

3. The method of claim 1, further comprising:
  performing adjustments based on the operating system compatibility information.

4. The apparatus of claim 1, further comprising:
  starting a background application based on the operating system compatibility information.

5. The method of claim 1, further comprising:
  checking other software module attribute information the software module attribute information being included in the software module.

6. The method of claim 5, further comprising:
  starting a background application based on the software module attribute information.

7. A method of developing a software module for an electronic device, comprising:
  accessing a software development tool kit;
  developing the primary functionality of the software module using the software development tool kit;
  configuring compatibility information to be included in the software module, the compatibility information indicative of compatibility between the software module and the host device; and
  compiling the software module into a format executable by the electronic device.

8. The method of claim 7, wherein the electronic device is a handheld computer.

9. The method of claim 7, wherein the compatibility information includes operating system information.

10. The method of claim 7, wherein the compatibility information includes wireless access information.

11. The method of claim 7, wherein the compatibility information includes display type information.

12. The method of claim 7, wherein the compatibility information includes sound system type information.

13. The method of claim 7, wherein the compatibility information includes processor information.

14. A method of providing compatibility between a software module and an electronic device, comprising:
providing an electronic device having a processor and a memory, the processor running an operating system;
installing a software module configured to run on the processor of the electronic device; and
checking development tools version information by the software module when the software module is being executed on the electronic device, the development tool information being incorporated into the software module, the development tools version information based on the version of development tools used to develop the software module.

15. The method of claim 14, further comprising:
determining the compatibility of the software module with the operating system based on the development tools version information.

16. The method of claim 15, further comprising:
enforcing constraints based on the development tools version information.

17. A method of using an electronic device, comprising:
providing an electronic device having a processor and a memory, the processor running an operating system;
providing access to the software module configured to run on the processor of the electronic device, the software module including compatability information, the software module having been installed on the electronic device and being executed on the electronic device;
checking operating system compatibility information by the software module running on the electronic device; and
selectively enabling an operating system backward compatibility mode based on the operating system compatibility information.

* * * * *